United States Patent [19]

Feo et al.

[11] Patent Number: 5,717,787
[45] Date of Patent: Feb. 10, 1998

[54] METHOD FOR DATA COMPRESSION BY ASSOCIATING COMPLEX NUMBERS WITH FILES OF DATA VALUES

[75] Inventors: John Thomas Feo, Dublin; David Carlton Hanks, San Ramon, both of Calif.; Thomas Arthur Kraay, Leeburg, Va.

[73] Assignee: The Regents of the University of California, Oakland, Calif.

[21] Appl. No.: 633,386

[22] Filed: Apr. 16, 1996

[51] Int. Cl.$^6$ .............................. G06K 9/36; G06K 9/46
[52] U.S. Cl. .............................. 382/232; 382/249; 395/13
[58] Field of Search .............................. 382/232, 233, 382/241, 247, 248, 249, 253, 243; 395/13, 612; 364/715.02

[56] References Cited

U.S. PATENT DOCUMENTS 5,343,554  8/1994  Koza et al. .............................. 395/13

Primary Examiner—Leo Boudreau
Assistant Examiner—Phuoc Tran
Attorney, Agent, or Firm—Henry P. Sartorio; Richard B. Main

[57] ABSTRACT

A method for compressing data for storage or transmission. Given a complex polynomial and a value assigned to each root, a root generated data file (RGDF) is created, one entry at a time. Each entry is mapped to a point in a complex plane. An iterative root finding technique is used to map the coordinates of the point to the coordinates of one of the roots of the polynomial. The value associated with that root is assigned to the entry. An equational data compression (EDC) method reverses this procedure. Given a target data file, the EDC method uses a search algorithm to calculate a set of m complex numbers and a value map that will generate the target data file. The error between a simple target data file and generated data file is typically less than 10%. Data files can be transmitted or stored without loss by transmitting the m complex numbers, their associated values, and an error file whose size is at most one-tenth of the size of the input data file.

3 Claims, 3 Drawing Sheets

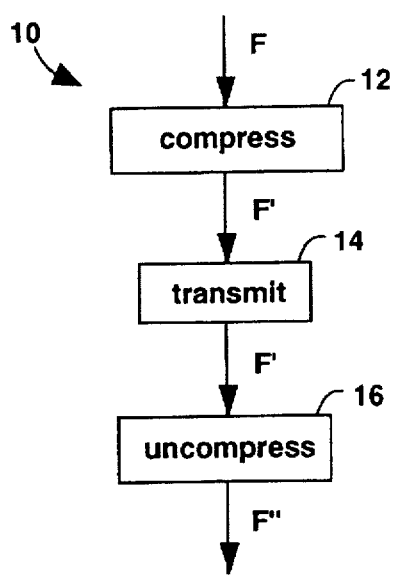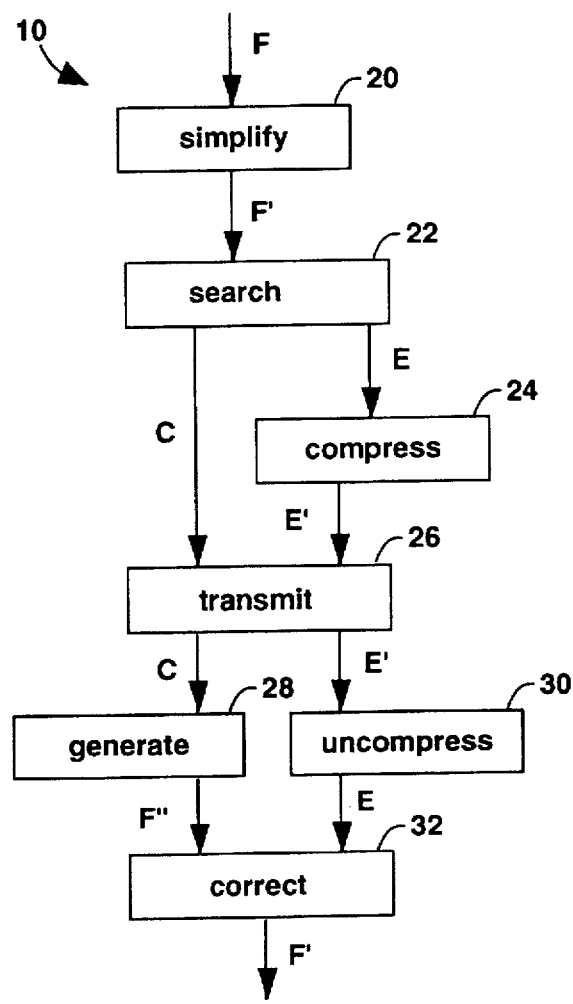

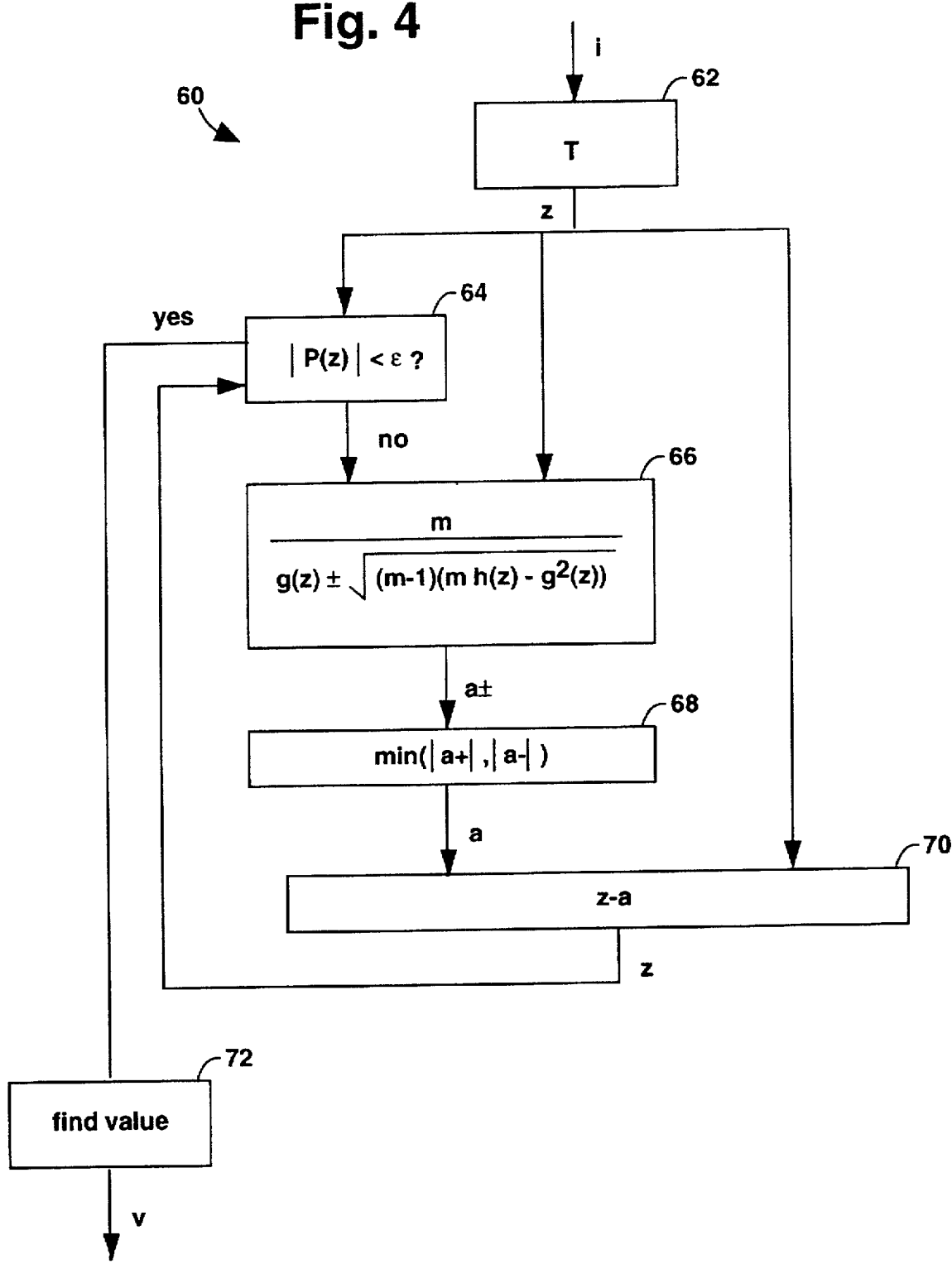

METHOD FOR DATA COMPRESSION BY ASSOCIATING COMPLEX NUMBERS WITH FILES OF DATA VALUES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to data compression and more particularly to methods and systems for representing a computer data file as a set of complex number-value pairs.

2. Description of the Background Art

A so-called graphics interchange format (GIF) was developed by a telephone-based information source, CompuServe Incorporated. GIF uses Lempel-Ziv and Welch (LZW) compression as its primary source of image compression. The syntax of the GIF data stream provides the information required for the preparation of LZW decoding, such as color maps. GIF compression is lossless, with a compression ratio from 2:1 to 9:1 being possible, depending on the type of data being compressed.

LZW Encoding reduces the size of a data set in one dimension. The compression method developed by Lempel-Ziv and Welch, known as LZW compression, seeks to take advantage of repeated sequences of data values, even when the repetition exists non-contiguously. A unique code replaces a repeated sequence in the encoded data set, saving bytes each time that sequence is repeated. Consider the following data stream and its corresponding compressed data stream.

| original data set | 5 23 7 | 12 | 5 23 7 | 6 12 | 5 23 7 | 6 12 |
|---|---|---|---|---|---|---|
| compressed data set | Code1 | 12 | Code1 | Code2 | Code1 | Code2 |

Given the compressed data set, a table or "codebook" which assigns values to each code is used to decode the data. In the example above, such a codebook would assign "5 23 7" to the entry for Code1. If the codebook is large, however, the overhead costs of storing it can greatly reduce the efficiency of compression. LZW compression was developed to avoid this storage requirement. It also has the pleasant characteristics of relatively low memory requirements, due to its sequential processing, and simplicity of algorithm, leading to implementations which use a relatively small amount of computer code.

In LZW compression, an encoder and decoder build identical codebooks as the data stream is processed sequentially. The encoder outputs a pattern code only after it has found the pattern more than once. The first time it processes a sequence of data, it places that sequence in its codebook and outputs the sequence without any encoding. During decoding, this sequence is output and an entry into the codebook is made for this sequence. The entry is assigned a code in the same manner that the encoder assigned a code, so that when this code is encountered later, the decoder will output the correct sequence of values.

To further illustrate LZW compression, the following algorithms for encoding and decoding are presented, together with simulation examples for each. Here, a colon is used to indicate concatenation. For example "abc": "d"= "abcd".

```
encoding
    initialize the codebook - one entry for each possible individual
    value
    prefix = empty string
    repeat
        dataValue = next data value in data stream
        if prefix : dataValue is already in codebook
            then prefix = prefix : dataValue
            else {
                add prefix : dataValue to the codebook
                output the prefix code from the codebook
                prefix = dataValue}
    until all the data values are processed
    output the code from the codebook for prefix
```

For the encoding algorithm, a string of data values is built until the string is different from any other previously coded string. New data strings are always made of some previously known strings (which has been entered into the codebook) plus one new data value. When a new pattern is found the new pattern is immediately added to the codebook, the code for the prefix of the new data string is output, and the data string is reinitialized to begin the search for a new data string. Each time a code is output, a new entry is made in the codebook.

```
simulation of encoding
    assuming that original data can be one of three different values - a, b, or c.
    Consider the sample data stream "a b a b b b b c".
    Initialize the codebook as follows:
```

| Code | Data Value | Prefix : Data Value | | | | |
|---|---|---|---|---|---|---|
| 0 | a | - : a | | | | |
| 1 | b | - : b | | | | |
| 2 | c | - : c | | | | | prefix=empty string

| input dataValue | prefix: dataValue | new codebook entries | | | new prefix |
|---|---|---|---|---|---|
| | | code | data string | output | |
| a | - : a | [code 0 already entered] | | | 0 |
| b | 0 : b | 3 | ab | 0 | 1 |
| a | 1 : a | 4 | ba | 1 | 0 |
| b | 0 : b | [code 3 already entered] | | | 3 |
| b | 3 : b | 5 | abb | 3 | 1 |
| b | 1 : b | 6 | bb | 1 | 1 |
| b | 1 : b | [code 6 already entered] | | | 6 |
| c | 6 : c | 7 | bbc | 6 | 2 |

```
output last prefix value:                    2
decoding
    initialize the codebook - one entry for each possible individual value
    code = the first code value in the compressed data stream
    output the data string that corresponds to code in the codebook
    repeat
        oldCode = code
        code = next code value from compressed data stream
        if code already exists in the codebook
            then {
                output the data string corresponding to code
                prefix = oldCode
                suffix = first value from output data string}
            else {
                prefix = oldCode
                suffix = first value from the prefix data string
                output prefix : suffix}
        add prefix : suffix to the codebook
    until all code values are processed
```

For the if-statement, when the input code is already in the codebook, it is a straight forward process to output the string corresponding to that code. When a code is encountered which is not yet in the codebook, the immediately preceding data values must form the new data string. The new data string being formed is immediately preceded by itself. Since the preceding suffix starts the current prefix, the new code's data string must begin and end with the same data value. And since the pattern is repeated, the prefix of the new data string must be the string corresponding to the code previously input to the decoder. Therefore, the value of the undefined code is oldCode concatenated with the first value of old-Code.

```
simulation of decoding
    The encoder produced the data stream "013162". This now becomes our input
    for the decoder.
    Initialize the codebook as follows:
    Code    Data Value    Prefix : Data Value 0         a             - : a
      1         b             - : b
      2         c             - : c
    code = 0
    output a (data value of code 0)
```

|         |      | input in   |        |        |        | new codebook entries |        | prefix: |
|---------|------|------------|--------|--------|--------|----------------------|--------|---------|
| oldCode | Code | codebook?  | prefix | suffix | output | code                 | string | suffix  |
| 0       | 1    | yes        | 0      | 1      | b      | 3                    | ab     | 0:1     |
| 1       | 3    | yes        | 1      | 0      | ab     | 4                    | ba     | 1:0     |
| 3       | 1    | yes        | 3      | 1      | b      | 5                    | abb    | 3:1     |
| 1       | 6    | no         | 1      | 1      | bb     | 6                    | bb     | 1:1     |
| 6       | 2    | yes        | 6      | 2      | c      | 7                    | bbc    | 6:2     |

The string produced by the decoder, "ababbbbc", is the original string which was input into the encoder.

The effectiveness of LZW compression is data dependent. Simple line drawings that are stored in raster format can be compressed as much as 16:1 or more. Raster scanned photographs are expected to achieve compression ratios from 2:1 to 9:1.

The Joint Photographic Experts Group (JPEG) has issued a suite of standards, with twenty nine distinct coding processes in all. The so-called JPEG compression standard was intended to satisfy a broad range of applications. Its seeks high compression ratios and high image fidelity. Applications can select from a broad range of compression ratios, trading off image quality for higher compression to meet the specific needs of an application. No restrictions are made on the image contents, e.g., complexity or range of colors, or characteristics, such as resolution. A manageable computational complexity allows for reasonable software implementations and fast hardware implementations. A lossless encoding mode provides for exact image reproduction. A sequential encoding mode provides for image reproduction using multiple passes through the data, where the image is initially blurry and each pass through the data adds further clarity to the image. And a hierarchical encoding mode is provided for image reproduction using a sequence of frames, each at different resolutions.

Other prior art data compression methods exist and some are in wide use. However, all leave the user wanting higher levels of compression with lower losses occuring in such compression. No conventional compression method has thus far proven totally satisfactory, even in particular applications.

SUMMARY OF THE INVENTION

An object of the present invention is to provide a method for starting with a data file to compress and finding the roots of the polynomial, assuming such a polynomial exists, that will generate the same data file in a reconstruction either exactly or within some threshold of error.

Briefly, a method embodiment of the present invention compresses data for storage or transmission. For a data file of pixel values organized as an n·n grid of pixels, the data file of pixel values, or any computer data file, may be compressed by the method of the present invention. Letting G be an n·n grid superimposed on the complex plane, and P, an m degree polynomial. Letting A be a function of the first derivative of P, and letting B be a function of the second derivative of P. And further letting C(i) be a map to a unique color for each root of P, where $1 \leq i \leq m$. A and B are then iteratively solved for each z in G. The solution ultimately converges within some epsilon of one of the roots of P. When z converges to root i, C(i) is assigned to z. P, A and B can be defined for any m numbers in the complex plane and color function C to generate a data file of pixel values encoded by m complex numbers.

An advantage of the present invention is that a method for compressing data is provided.

Another advantage of the present invention is that a method of compressing data with few losses and high compression ratios is provided.

BRIEF DESCRIPTION OF THE DRAWINGS

FIG. 1 is a flowchart of an equational data file compression method embodiment of the present invention for data compression;

FIG. 2 shows a more detailed flowchart of the method of FIG. 1;

FIG. 4 is a flowchart of a generating method useful in the method of FIGS. 2 and 3.

DETAILED DESCRIPTION OF THE INVENTION

Figure 3:
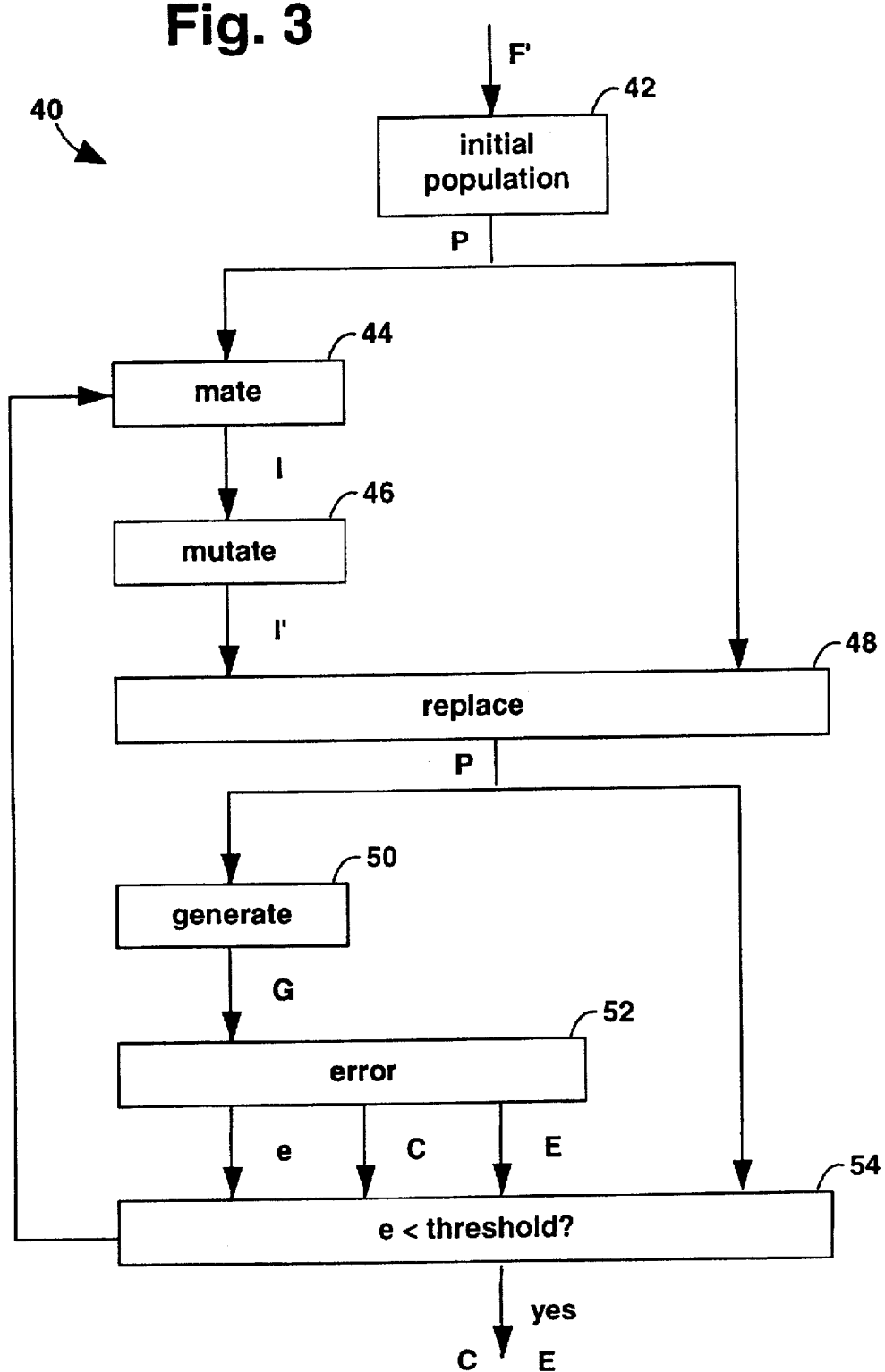
FIG. 3 is a flowchart for a generic search method useful in the method of FIG. 2.

FIG. 1 illustrates an equational data compression (EDC) method embodiment of the present invention for compressing and decompressing data, and is referred to herein by the general reference numeral 10. The EDC method 10 comprises a compression step 12, a transmission step 14, and a decompression step 16. The compression step 12 takes the data file F and returns a data file F'. The file F is a file of values whose type depends on the data medium. For example, if the file F is a text file, then the values might be octal numbers such that F(i) encodes the i-th character of the text. If the file F is an image file file, then the values might be eight-bit binary numbers such that F(i) encodes the color of the i-th pixel of the data file. The compression step 12 reduces the size of the data file to minimize the amount of data that needs to be transmitted or stored by the transmission step 14.

The transmission step 14 either transmits or stores the data file F'. The transmission or storage of data is assumed here to be without error. Any of a number of conventional methods may be used to detect and/or correct errors due to faulty transmission or storage.

The decompression step 16 inputs the data file F' and outputs the data file F". It uses an inverse method to that used by the compression step 12 to uncompress the data. Where file F" equals file F, then the compression method was lossless. Otherwise, the compression resulted in data loss. The extent to which the compression method is lossy depends on the methods used steps 12 and 16.

FIG. 2 illustrates the EDC method 10 in greater detail. A simplify step 20, a search step 22, and a compress step 24 are equivalent to the compression step 12 of FIG. 1. A transmission step 26 is equivalent to the transmission step 14 of FIG. 1. A generating step 28, a decompression step 30, and a correction step 32 are equivalent to the decompression step 16 in FIG. 1. The simplify step 20 takes the data file F and returns a simplified data file F'. This step may or may not be empty. The form of the simplification is data dependent and the degree of simplification depends on the amount of loss information tolerable by the sender and receiver. For example, this step might reduce the number of colors in a data file file from a maximum of 256 to twenty six by dividing each value in the file F by 10. The search step 22 takes the data file F' and returns two outputs, C and E. Output C is a set of tuples $\{z, v\}$, such that z is a complex number, and v is a value in F'. The search step 22 uses a search heuristic to find C such that $G(C,i)=F'(i)$. Since it is unlikely that the search heuristic will return a set of numbers that regenerates F' without loss, the step returns an error file E. The tuple $\{i, y\}$ is in E if and only if $G(C,i) \neq F'(i)$ and $F'(i)=y$. A conventional genetic algorithm is used to find C, however, practically any search algorithm can be used. The compression step 24 compresses the file E, e.g., using any conventional lossless compression algorithm. Its output is the data file E'. The transmission step 26 either electronically transmits or stores C and E', e.g., across the Internet or into a hard disk file. Such transmission or storage of the data is assumed here to be without error. The generating step 28 implements the generation of an algorithm G, described in connection with FIG. 4. The generating step 28 inputs a set of complex numbers C and returns the data file F". The decompression step 30 uncompresses the data file E' to regenerate a data file E without loss. The correction step 32 inputs files F" and E, and returns a data file F'. For each tuple $\{i, y\}$ in E, the box sets the value of F"(i) to y.

The search step 22 of FIG. 2 searches the complex plane for a set of tuples $\{z, v\}$ such that a generate method can return a file F" as close as possible to F'. Any discrepancy between F" and F' is returned in E. The particular search algorithm used is not important. A genetic algorithm whose gross structure is shown in FIG. 3 has been used successfully. The particular mating, mutation, and replacement method used is beyond the scope of this description. Possible choices of methods are well documented in the literature.

FIG. 3 illustrates a generic search method 40. A step 42 generates a population of possible solutions, e.g., it generates two or more possible values for C. Each value is referred to as an individual of the population. A step 44 mates the individuals of the population and thus generates a set of new individuals. As in nature, the method tends to preserve the best characteristics of the population and to eliminate the worse characteristics. Over the generations, the population includes fitter and fitter individuals, e.g., better and better solutions to the search problem. Typically, the methods implemented by steps 50 and 52 of FIG. 3 are used to evaluate the fitness of individuals. A step 46 mutates selected individuals. Mutations or random changes to the data are necessary to prevent the method from converging to at a local maximum. A step 48 replaces individuals from the previous generation with those born and mutated by steps 44 and 46, respectively. An output of step 48 is the next population of individuals. A step 50 generates a data file for each individual in P. The set of data files is G. The step 50 is equivalent to step 28 of FIG. 2. A step 52 calculates the error between F' and each data file generated by step 50. A typical error function is the sum of diff(i), where diff(i) is 1 if the two files have different values at position i, else 0. Step 52 returns the smallest error value computed (e), the individual that generated the smallest error value (C), and a file of the differences between that individual and F' (E). A step 54 compares the error value with some threshold value. If the comparison is true, then the search terminates and C and E are returned; else, the new population and control are passed back to step 44.

The generation step 28 of FIG. 2 generates the file F" of n values, $1 \leq i \leq n$, from C. Letting P be a m-th degree complex polynomial whose roots $r_j$, $1 \leq j \leq m$, m complex numbers in C, and letting T be a function that transforms integers to complex numbers, then for each integer i, $1 \leq i \leq n$, step 28 executes the data flow shown in FIG. 4. The inputs to the generating step 28 of FIG. 2 are assumed to be available to all the steps in FIG. 4, and so we do not explicitly show their edges.

FIG. 4 illustrates a generating method 60. A step 62 applies a transform function T to i and returns z. The appropriate transform function to use depends on the type of the data file. For example, if the data file is a 2-D data file of size n by n, then T(i) might return the complex number {(i div n)/n, (i mod n)/n}. A step 64 computes P(z). If the computed value is less than some small value, then the step returns yes. Otherwise, the step 64 returns no. If the step 64 returns no, then control is passed to a step 66 that computes the displayed expression returning two complex values, $a^+$ and $a^-$. A step 68 passes the value with the smallest absolute value to a step 70 that decrements z by this value. The decremented value and control back are passed back to the step 64. If the step 64 returns yes, then control is passed to a step 72 that searches C, and returns the value associated with the complex number in C closest to z. The iterative computation of FIG. 4 terminates when z is within epsilon of some root of P.

An equational data compression (EDC) method of the present invention reverses the creation data files that used an iterative root finding method. Data files can be created using this method, and equations which closely approximates a given data file can also be found.

An iterative root finding method, developed by one of the present inventors, Thomas Kraay, starts with a complex function, P, with m complex roots and an arbitrary initial guess z, in the complex plane, the iterative root finding method converges unexpectedly fast to one of the function's roots, usually in two to four iterations. The method has converged over ten million times to within $10^{-6}$ of a root value.

The iterative root finding method, e.g., illustrated in FIG. 4, can be described mathematically, as follows:

Let P(z) be a known polynomial with unknown roots $r_1, \ldots, r_m$. Then, $$P(z) = \prod_{i=1}^{m} (z - r_i).$$

For $z \notin \{r_1, \ldots, r_m\}$, take the natural log of both sides to get, $$\ln P(z) = \ln \prod_{i=1}^{m} (z - r_i) = \sum_{i=1}^{m} \ln(z - r_i).$$

Taking the derivative of both sides, $$\frac{d}{dz} \ln P(z) = \frac{d}{dz} \sum_{i=1}^{m} \ln(z - r_i) = \sum_{i=1}^{m} \frac{d}{dz} \ln(z - r_i) = \sum_{i=1}^{m} \frac{1}{(z - r_i)},$$

and since, $$\frac{d}{dz} \ln P(z) = \frac{P'(z)}{P(z)},$$

then, $$g(z) = \frac{P'(z)}{P(z)} = \sum_{i=1}^{m} \frac{1}{(z - r_i)}. \quad \text{(eq. 1)}$$

Now taking the derivative of g(z) with respect to z, provides, $$\frac{d}{dz} \frac{P'(z)}{P(z)} = \frac{d}{dz} \sum_{i=1}^{m} \frac{1}{(z - r_i)} = \sum_{i=1}^{m} \frac{-1}{(z - r_i)^2},$$

and since, $$-\frac{d}{dz} \frac{P'(z)}{P(z)} = \frac{[P'(z)]^2 - P(z)P''(z)}{P^2(z)},$$

then, $$h(z) = \frac{[P'(z)]^2 - P(z)P''(z)}{P^2(z)} = \sum_{i=1}^{m} \frac{1}{(z - r_i)^2}. \quad \text{(eq. 2)}$$

Given a complex number z, the values of g(z) and h(z) can be calculated. Let $r_j$ represent some root of P(x), and define the value a such that, $$a = z - r_j. \quad \text{(eq. 3)}$$

The equations (1) and (2) can be rewritten, $$g(z) = \frac{1}{a} + \sum_{\substack{i=1 \\ i \neq j}}^{m} \frac{1}{(z - r_i)} \quad \text{and} \quad \text{(eq. 1a)}$$

$$h(z) = \frac{1}{a^2} + \sum_{\substack{i=1 \\ i \neq j}}^{m} \frac{1}{(z - r_i)^2}. \quad \text{(eq. 1b)}$$

There exists a complex number b such that, $$\sum_{\substack{i=1 \\ i \neq j}}^{m} \frac{1}{(z - r_i)} = \frac{m - 1}{b},$$

giving $$g(z) = \frac{1}{a} + \frac{m - 1}{b}. \quad \text{(eq. 1b)}$$

Let $\epsilon$ be the complex number, such that, $$\sum_{\substack{i=1 \\ i \neq j}}^{m} \frac{1}{(z - r_i)^2} = \frac{m - 1}{b^2} + \epsilon. \quad \text{(eq. 4)}$$

For m>2, discarding $\epsilon$ introduces error, but gives, $$h(z) = \frac{1}{a^2} + \frac{m - 1}{b^2} \quad \text{(eq. 2b)}$$

There are two equations (1b) and (2b) in two unknowns (a and b). It can be shown that, $$a^{\pm} = \frac{m}{g(z) \mp \sqrt{(m - 1)(mh(z) - g^2(z))}}. \quad \text{(eq. 5)}$$

Which is equivalent to the step 66. To aid in convergence, a is assigned the value of smaller magnitude, $$a = \begin{cases} a^+ & \text{if } |a^+| < |a^-| \\ a^- & \text{otherwise} \end{cases} \quad \text{(eq. 6)}$$

Which is equivalent to the step 68. By equation (3), $r_j=z-a$ is a root of the equation. However, having discarded $e$ this equality no longer holds. $z-a$ now only approximates $r_j$.

Given an initial guess $z$, $P(Z)$ is calculated. If the absolute value is greater than $\epsilon$, a is calculated letting $z=z-a$, e.g., step 70. Repeating this process, as in the step 64, until the absolute value of $P(z)$ is less than $\epsilon$, a root of the polynomial is converged within $\epsilon$.

The iterative root finding method is used to generate data files. A file of size $n$, $0 \leq i \leq n-1$ is created, using the iterative root finding method. Let $P(Z)$ be a polynomial with roots $r_1$, ..., $r_m$ and let $v_1$, ..., $v_m$ be a set of m values. Start by defining a transformation function from integers to points in the complex plane. Letting $n=W*H$, then $T(i)$, $0 \leq i \leq n-1$, returns the complex number, $$z = \left\{ \frac{i \, div \, W}{H}, \frac{i \, mod \, W}{W} \right\}.$$

Which is equivalent to the step 62.

Using $z$ as an initial guess, the iterative method is used to calculate a root of $P(z)$. As in the step 72, if the i-th root is returned, then the value $v_i$ is assigned to the i-th datum in the file. The resulting file of values is referred to as a root generated data file (RGDF) and the procedure is called a generation process. For example, to create a data file data file of 40,000 pixels. Let $W=200$, $H=200$, $r_1=0.0+0.0i$, $v_1$=blue, $r_2=0.75+0.75i$, $v_2$=green, $r_3=0.8-0.15i$, $v_3$=gray, $r_4=1.5-0.50i$, and $v_4$=purple. Then, the RGDF created corresponds to a particular data file. Such file is uniquely encoded by the four root-value pairs used to create it.

The generation process can be reverse engineered. Since EDC is given a data file F of size n, $0 \leq i \leq n-1$, with m unique values, the m complex numbers can be found such that the RGDF returned by the generation process is equivalent to F. Although reversing the mathematical formulations might appear impossible, an attractive solution method is the use of general purpose search methods. The problem can be viewed as a search for m points in the complex plane, where the optimality of a set of m points is defined by a fitness function. The current embodiments use a genetic algorithm to search for the m points, e.g., as in FIG. 3.

Genetic algorithms are search algorithms that depend on an imitation of nature and use the mechanics of natural selection and natural genetics. The object is to improve a set of initial solutions, referred to as a "population" of individuals, using "recombination" and "mutation" of their "genetic material". The method combines survival of the fittest among solutions with a structured and randomized information exchange.

Each "generation" creates new solutions that replace old and ineffective solutions in the population. A solution's probability of recombination is directly proportional to its fitness. Only the most effective solutions survive. The selection of solutions for recombination and mutation, as well as the replacement of solutions in the population are driven by genetic operators controlled by probability.

Genetic algorithms can work with several solutions at the same time, improving the solutions in each generation, while simultaneously exploring new solutions in the search space. Genetic algorithms are also easily adapted to a variety of problems requiring adjustments to only the representation of solutions and the fitness function. Because the objective function used to measure fitness is the only information used to guide the search, no auxiliary or derivative information is required.

A simple genetic algorithm (SGA) is described with the aid of the pseudo code of Table I. A solution consists of one, or occasionally more, bit-encoded strings, or chromosomes. Each bit's position is its locus and the value of the bits are its allele (0 or 1 for binary strings). For simplicity, unless otherwise stated, we assume a single chromosome per individual and binary alleles.

TABLE I randomly create and evaluate an initial population of size n
for gen = 1 to MAX_GEN
    create a mating pool selecting individuals from the
        population using fitness proportionate selection
    form n/2 pairs from the mating pool and perform
        crossover and mutation
    replace current generation with offsprings
    evaluate the fitness of the new population
end for
output fittest individual as the solution The first generation of a genetic algorithm consists of individuals whose chromosomes are randomly constructed, e.g., step 42. Assuming that genes may be one of two values, either 0 or 1, and letting $P_1$ be the probability that a given gene will have the value 1. Each gene of each chromosome in the initial population can be assigned a value 1, with probability $P_1$, or a value of 0, with probability $P_0=1-P_1$.

Once the procedure has defined all genes of a chromosome, it then applies the fitness function to determine the chromosome's fitness value. Once the procedure has created an initial population and determined the fitness of each individual, it then creates the next generation.

For successive generations, several mate selection, mating, and replacement are used. The process is continued for an indicated number of generations, or until some other terminating condition is encountered.

As the step 44 illustrates, mate selection selects n individuals to parent offspring in the next generation. The selected individuals create a mating pool. Such individuals are chosen according to their fitness values. On average, those with higher fitness values are selected more often than those with lower fitness values. More exactly, the probability that the algorithm selects individual $I_i$ with fitness $F_i$ is, $$P_i = \frac{F_i}{\sum_{j=1}^{n} F_j}.$$

This method, known as fitness proportionate reproduction (FPR) selection, is an artificial version of natural selection, a Darwinian "survival of the fittest" among individuals.

Table II represents a sample population of four individuals, their fitness values and selection probabilities, and the results of mate selection. In this example, the string is a binary number and the fitness function is $f(x)=x^2$.

TABLE II

| i | INDIVIDUAL $I_i$ | FITNESS $F_i$ | SEL. PROB. $P_i$ | Mating Pool |
|---|---|---|---|---|
| 1 | 10011 | 361 | 0.310 | 11001 |
| 2 | 00110 | 36 | 0.031 | 10011 |
| 3 | 01100 | 144 | 0.123 | 01100 |
| 4 | 11001 | 625 | 0.536 | 11011 |
| Total | | 1166 | 1.000 | |

Once the mate selection is complete, the members of the mating pool are randomly divided into pairs for mating. Their chromosomes are manipulated by crossover and mutation with probability $P_x$ and $P_m$, respectively.

During the crossover operation, a crossover site, a position between the individuals' genes, is selected at random. The alleles to the right of the crossover site are then swapped between the pair, as in Table III.

TABLE III

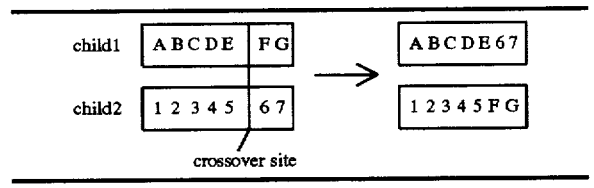

As in step 46, when $P_x<1.0$, some pairs may not undergo the crossover operation, but all pairs are subject to mutation. The mutation operation considers each allele in every individual, and changes its value with probability $P_m$. When an allele is mutated, its value changes from 0 to 1 or 1 to 0. This operation allows the algorithm to recover genetic material which has been lost and to introduce new genetic material.

Table IV illustrates a full reproduction phase for $P_x=0.667$ and $P_m=0.033$.

TABLE IV

| i | Mating pairs | fitness | After crossover | After mutation | New generation | fitness |
|---|---|---|---|---|---|---|
| 1 | 11001 | 625 | 11100 | 11100 | 11100 | 784 |
| 2 | 01100 | 144 | 01001 | 01001 | 01001 | 81 |
| 3 | 10011 | 361 | 10011 | 10111 | 10111 | 529 |
| 4 | 11001 | 625 | 11001 | 11001 | 11001 | 625 |
| Total | | 1755 | | | | 2019 |

The step 48 includes a steady state genetic algorithm (SSGA) that is a variant of the SGA. In the SSGA, only a subset of individuals in a population, e.g., a "generation gap", are replaced in every generation. The size of the generation gap, G, is usually expressed as a fraction of the overall population size. Thus, if n is the population size, the number of individual to be replaced each generation is G*n. A commonly chosen value for G is 2/n. Only one pair is chosen to mate, and their offspring replace two individuals in the population. When G=1.0, the algorithm replaces all individuals, as is equivalent to the SGA. With G<1.0, a replacement rule is need to decide which individuals should perish to make room for the new offspring. Such individuals could be those with the lowest fitnesses. In inverse ranking, the individuals are ranked according to their fitnesses. Each individual is considered, starting with the least fit, and individuals are eliminated with probability greater than 1/n until only two individuals remain.

SSGA thus imitates nature more accurately than the SGA, but has several drawbacks. Because low fitness individuals are quickly dismissed, the fitter individuals tend to dominate faster, leading to a greater possibility premature convergence. Also, the SSGA is not easily parallelizable, depending on the size of G. If G=2/n, there is no parallelism.

A variation of the SGA with linear fitness scaling has been used with success in embodiments of the present invention.

The deviation from ordinary SGA involves the encoding of the problem and the manipulation of roots. Various methods have been attempted, e.g., in the initial population generation and root mutation.

The data file to compress is defined here as the target file. The target file is compressed and encoded with method embodiments of the present invention.

For encoding, an individual is comprised of a chromosome with N binary alleles, and N complex numbers and values, one for each locus in the chromosome. Table V represents an individual in this encoding.

TABLE V

| allele 0 | complex # 0 | value 0 |
| allele 1 | complex # 1 | value 1 |
| allele 2 | complex # 2 | value 2 |
| ... | ... | |
| allele N-1 | complex # N-1 | value N-1 |

A complex number is active if its corresponding allele in the chromosome is one. The roots of the polynomial associated with the individual are the active complex numbers. Thus, the degree of this polynomial is exactly the number of ones in the chromosome.

Table VI represents a polynomial associated with a sample individual.

TABLE VI

| 0 | 5.0 + 3.2i | blue |
| 1 | 3.3 − 1.6i | red |
| 1 | −2.4 + 10.0i | grey |
| 0 | 4.1 − 5.9i | purple |
| 1 | −0.1 − 1.7i | green |

$P(z) = [z − (3.3 − 1.6i)] \ [z − (−2.4 + 10.0i)] \ [z − (−0.1 − 1.7i)]$

For the initial population, the value of each allele in each chromosomes in the initial population is randomly chosen 0 or 1, with equal probability. The complex numbers corresponding to each locus are chosen by creating a vector of random angle and random length (less than some value, L), transforming it to the form x+iy, and adding it to C, a complex number in the middle of the frame in the complex plane into which pixel locations are translated. Each locus of each chromosome in the population is assigned its own randomly generated root. Values are assigned randomly with equal probability.

For successive generations, mate selection, crossover, and mutation are conventional, except for a few points. No replacement policy is needed since as we use the SGA model. The triplet of allele, root, and color always stay together. Thus, when a crossover occurs, the roots and colors corresponding to each moved allele are also moved. The changing of the value of a root is also different. Like mutation of alleles, each root is considered for adjustment every generation. Adjustment occurs with small probability. When a root is adjusted, it is moved a random distance, e.g., less than some variable length, in the direction of a random angle.

The fitness measurement depends on how many values in the generated file match the corresponding value in the target file. The maximum fitness is n. The fittest file, e.g., file C in FIG. 2, to emerge from the genetic algorithm, referred to as the generated file, is most likely not equivalent to the target file. A greedy algorithm is applied to improve the solution and record the error entries in an error file, e.g., file E in FIG. 2.

For data file improvement, once the genetic algorithm converges, the generated file is improved using a greedy algorithm, that systematically adjusts each active root in the following way. An imaginary circle is placed around the root with a random radius. Fitnesses are sampled around the circle to determine the angle we should move the root to maximize fitness. A line is then drawn at this angle, and fitnesses sampled in order to determine the best distance to move the root in this direction. The process is typically repeated until further attempts result in little or no improvement in fitness.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for compressing and uncompressing data for storage or transmission, wherein a data file is stored as a file of size N, and letting T be a function that maps integers to points in the complex plane, P be an m degree polynomial, and A be a function of the first derivative of P, and B be a function of the second derivative of P, and further letting C(i) be a map to a unique value for each root of P, where $1 \leq i \leq m$, then A and B are then iteratively solved for each $z=T(i)$, $1 \leq i \leq N$, and a solution ultimately converges within some epsilon of one of the roots of P, for when z converges to root j, C(j) is assigned to z, and P, A and B can be defined for any m numbers in the complex plane and color function C to generate a data file of pixel values encoded by m complex numbers.

2. The method of claim 1, wherein given a data file of size N, the m complex numbers and value function C are found that encode said data file using an optimization method, wherein for a given target data file to compress, a main process is repeated until a solution sufficiently close to the target is found or some arbitrary maximum number of generations is exceeded, wherein said main process comprises producing a data file for each member of the generation, then evaluating each member's fitness against the target, then scaling the fitness values, then creating N/2 couples of polynomials, where each couple is comprised of two polynomials randomly selected from the current generation, and where the probability of a member being assigned to a couple is in direct proportion to its scaled fitness value, and then, mating each couple to generate two children, allowing for characteristics of each parent to contribute to each child or crossover and allowing for mutation.

3. A method for compressing data for transmission, wherein given a complex polynomial and a value assigned to each root, a root generated data file (RGDF) is created, one entry at a time, and each entry is mapped to a point in a complex plane, then an iterative root finding technique is used to map the coordinates of the point to the coordinates of one of the roots of the polynomial, then the value associated with that root is assigned to the entry, whereafter an equational data compression (EDC) method is used to reverse such steps, wherein given a target data file, the EDC method uses a search algorithm to calculate a set of m complex numbers and a value map that will generate the target data file, wherein data files are transmitted by transmitting the m complex numbers, their associated values, and an error file.

* * * * *